UNITED STATES PATENT OFFICE.

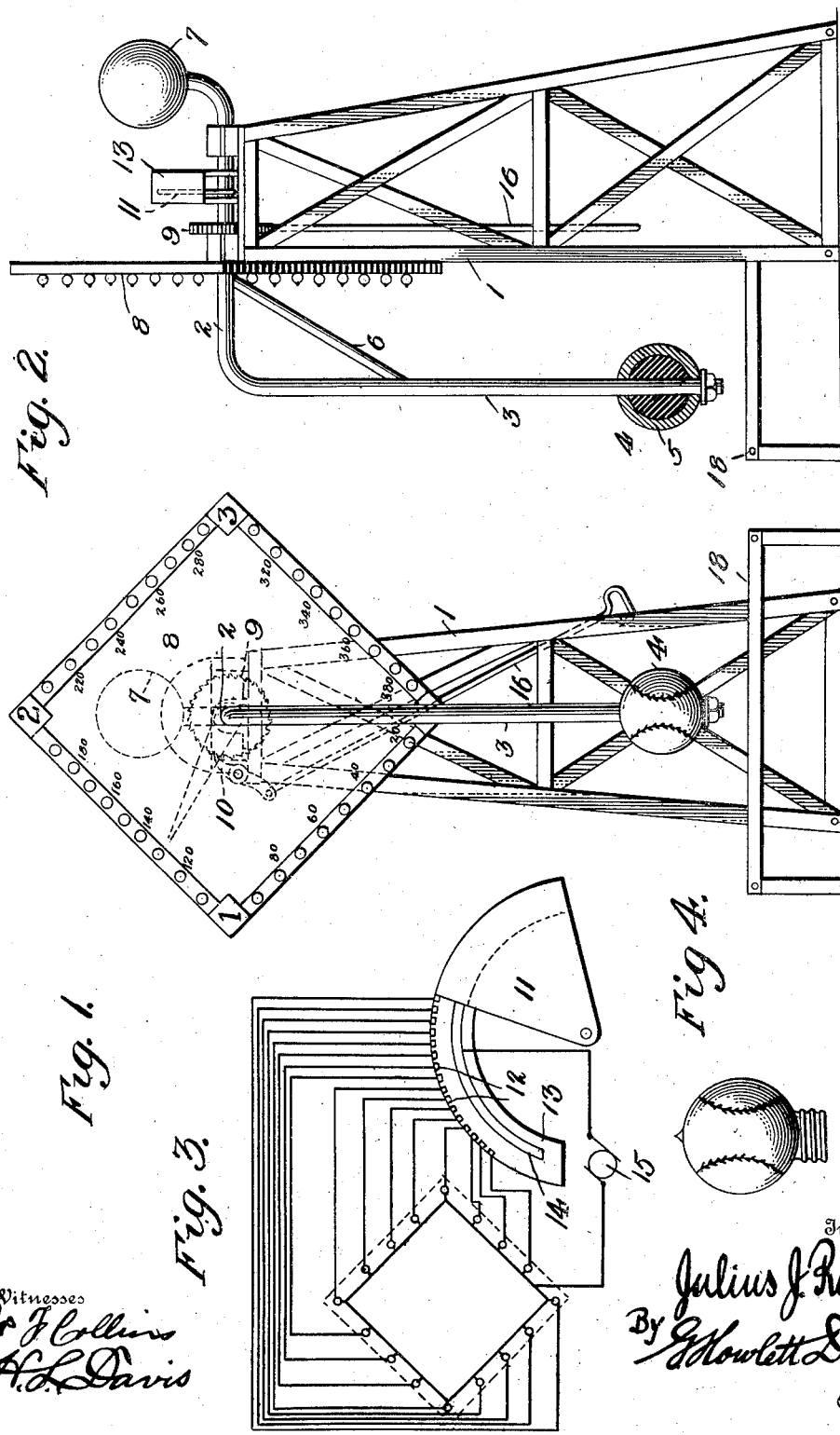

JULIUS J. RUBENS, OF ATLANTA, GEORGIA.

GAMING DEVICE.

983,315.  Specification of Letters Patent.  Patented Feb. 7, 1911.

Application filed August 24, 1909. Serial No. 514,440.

*To all whom it may concern:*

Be it known that I, JULIUS J. RUBENS, a citizen of the United States, residing at Atlanta, in the county of Fulton and State of Georgia, have invented certain new and useful Improvements in Gaming Devices, of which the following is a specification.

My invention relates to that class of gaming devices in which means are provided for measuring strength or force applied. Such devices are made in a great number of forms, such for instance as devices for measuring strength of the grip of the hand or for measuring the strength of a blow delivered by the fist, and are very commonly known, many of them being located in amusement parks and like places.

My invention has to do with a device of this kind in which strength or force applied is measured in a novel manner.

My invention I call a base-ball game. In the specific embodiment described herein I employ a diamond-shaped field and a ball associated therewith in such a manner that when struck it flies around the field, traveling either part the way around or all the way around, depending upon the force of the blow. In connection with the field and the associated ball I provide an indicating means adapted to indicate the position to which the ball has been knocked, and this indication of the position is an indication of the strength or force of a blow applied to the ball.

My invention has numerous good points which singly and combinedly go to make a device of this kind attractive and valuable. These advantages together with the details of construction of the specific embodiment I have chosen to describe will be readily understood from the following specification taken in connection with the accompanying drawings in which,—

Figure 1 is a front elevation of my device, Fig. 2 is a side elevation of the same, Fig. 3 is a diagram of the electrical connections to some lights which I employ in connection with my device, and Fig. 4 is a view showing one of the lights.

1 is a tower whose size may be made to suit the conditions under which the device is to be used. Out-door devices may be made much larger than in-door devices, and the devices will be made of such size as to meet the conditions under which they are to be used.

Mounted on the top of the tower is a horizontal shaft 2 which has its opposite ends bent at right angles to the main body of the shaft and in opposite directions in the same plane. The end in front of the tower, 3, extends toward the bottom of the tower and reaches nearly to it. At its extremity it carries a ball 4 which is loosely mounted on the member 3 as shown in Fig. 2. The ball is made up of an interior core of rubber, or other elastic material, and is provided with a raw-hide cover 5. A brace 6 extends from the main body of the shaft 2 to a point about the middle of its end member 3. The opposite end of the shaft 2 carries a counterbalancing weight 7 shown in the shape of a ball rigidly mounted on the shaft.

Associated with the ball 4 on the depending end of the shaft 2 is a diamond-shaped field 8 which is fixed to the front of the tower 1 in such a position that the shaft 2 passes substantially through the center of the field. It occupies a substantially vertical plane parallel to the end 3 of the shaft 2. This diamond-shaped field has its four corners marked H, and 1, 2 and 3, indicating the home plate and the three bases of a base-ball diamond. Also on the field and on the lines between the corners of the diamond or bases are other markings of a value increasing successively from the lower corner H to the bases 1, 2 and 3 in order and back to the corner H representing the home plate. On the shaft 2 is mounted a ratchet wheel 9 which coöperates with a pawl 10 mounted on the tower and is adapted to hold the shaft 2 in any position to which it may be moved within 180° on one side of a vertical line passing through the shaft 2. As shown, this vertical line also passes through the base 2 and the home plate H, and the 180° through which the shaft is held against counterclockwise rotation is on the left hand side looking at the device from the front.

The operation of my device as thus far described is as follows: The party desiring to play the game is provided with a base-ball bat. With this bat he strikes the ball 4 from the right just as he would strike it in case the ball were thrown for him to strike. The ball is driven forward and moves about shaft 2 as a center, being confined to the arc of a circle by the end member 3 on which it is suspended. Depending upon the strength of the blow the ball is knocked either part way or whole way around the field. If knocked less than half way around, after reaching the upper limit of its travel, it starts to fall back, but is prevented from doing so by the engagement of the teeth on the ratchet wheel 9 with the pawl 10. The strength of the blow is then read off from the markings on the lines between the bases by noting the position of the end member 3 with respect thereto. Instead of using the end member 3 as an index I may use a pointer connected either to it or to the shaft 2, for instance as shown by dotted lines. If the ball is knocked through more than 180°, that is, beyond the base 2 in a clockwise direction, the ball will fall unobstructed back to its lowest position or starting point, and this striking of the ball I call a "home run". It is obvious from the foregoing that with a suitable proportionment of parts of my device and with suitably framed rules of the game the device may be used for gaming with much interest, zest and enthusiasm. The weight of the ball may be made such that an extremely strong blow will be required to drive it through more than 180° and in such case a "home run" will not be easily secured with the result that it will be much striven for and the game made of intense practical interest.

As above described, my invention fulfils all the main requirements of a device of this kind, but in order to increase its attractiveness I have provided between the numerical markings for measuring the strength of the blow imparted to the ball electric lights which are adapted to be lighted up as the ball travels around the field. These electric lights may be of any color or may be varicolored, but I prefer to provide them round and paint or otherwise configure their outside surfaces to represent base balls. This is clearly shown in Fig. 4. I control these electric lights by a rotary switch, the moving part of which is mounted upon or geared to shaft 2. In the drawings it is shown as mounted on the shaft 2. This movable member 11 of the switch coöperates with fixed contacts 12 suitably mounted in the casing 13. One of these fixed contacts extends over the entire arc of the circle described by movable contact 11 (see Fig. 3), while the other fixed contacts are smaller and are grouped on an arc concentric with the first. The movable contact 11 as the shaft 2 is turned when the ball is moved bridges successively the smaller fixed contacts and the large fixed contact. The large contact 14 is connected to one terminal of a source of power 15, while the smaller contacts are connected successively one to each of the lights on the diamond, beginning at the home plate H. The other terminals of the lights are connected to the other terminal of the source of power, and they are thus lighted up successively as the ball 5 moves around the field. They remain lighted until the ball returns to its original position.

In order to release the ball when it is held in a position other than normal by the pawl 10, I provide a rod 16 connecting at its upper end with the pawl 10 and provided with a handle grip at its lower end, so that the pawl may be moved from the ratchet by pulling the rod. The ball 4, as has been said, is adjustably mounted on the member 3, being capable of both rotative movement and vertical adjustment by means of the nut which holds it in place. The rotative movement is for the purpose of causing the ball to be struck in different spots on its surface, so as to cause an even wear of the same and make the ball last longer. The ball 7 on the opposite end of the shaft 2 from the ball 4 is provided as a counter-balancing weight and plays a part in the adjustment of the apparatus. By suitably proportioning the weight 7, which in some instances may be made removable, the effective weight of the ball 4 may be varied as desired.

At the foot of the tower I provide a guard rail 18 which extends out beyond the plane of the ball 4 in order that persons may be prevented from standing in the path of the ball and being hit when the ball is struck.

My device besides being valuable as a gaming device is valuable as an exercising device. In large sizes it is well adapted for use out-of-doors, and by suitable proportionment of parts can be adapted to the use of individuals of any physical constitution.

It is obvious that in adapting my device to the various conditions named and in giving it the most convenient and efficient form and attractive appearance many modifications may be made which do not depart from the generic spirit of my invention. I desire to cover all such modifications in the claims annexed hereto.

What I claim is,—

1. In a gaming device, in combination, a ball mounted to have its position changed by the application of force, a supporting member for said ball, said ball being adjustably mounted on said supporting member and being freely rotatable, a field associated therewith, and means for indicating the position to which said ball is moved.

2. In a gaming device, in combination, a ball mounted to have its position changed by the application of force, a supporting member for said ball, said ball being freely rotatable on said supporting member, a field associated therewith, and means for indicating the position to which said ball is moved.

3. In a device of the character described, in combination, a tower, a diamond-shaped field supported by said tower, a shaft supported by said tower and passing approximately through the center of said field, a ball suspended from said shaft in a position to be struck a blow, means connected with said shaft for indicating the position to which said ball is moved by the blow, means for holding said indicating means in the position to which it has been moved, and means for releasing said holding means.

4. In a device of the character described, a diamond-shaped field, lights mounted thereon, said lights being round and configured to represent base balls, a ball associated with said field and mounted to be struck a blow and have its position changed, and means for controlling said lights associated with said ball.

5. In a gaming device, in combination, a field, a ball associated with said field, a mounting for said ball which adapts said ball to be moved by the application of force, means dividing said field into bases, a plurality of lights studding said field on the circuit of the bases, and a switch operated by the movement of said ball, said switch lighting a number of lights successively, the number of lights so lighted depending upon the degree of force applied to said ball.

6. In a gaming device, in combination, a diamond shaped field, a ball associated with said field, a mounting for said ball which adapts said ball to be moved by the application of force, bases marked on said field, electric lights studding said diamond on the circuit of the bases, a switch whereby a number of lights are successively lighted and maintained lighted by the application of force to said ball, the number of lights depending upon the degree of force used, and means for extinguishing said lights at will.

7. In a gaming device, a relatively high tower, a gaming field supported by said tower, means for supporting from the top of said tower a ball near the bottom of said tower, said ball having a relatively large range of movement, and being adapted to be struck and caused to traverse its range, means for indicating the range of movement of said ball, means for holding said indicating means in indicating position, and means at the foot of the tower for releasing said holding means.

In testimony whereof I affix my signature in presence of two witnesses.

JULIUS J. RUBENS.

Witnesses:
H. L. QUARLES,
ANDREW J. HANSELL.